US010830389B2

(12) United States Patent
Gordon

(10) Patent No.: US 10,830,389 B2
(45) Date of Patent: Nov. 10, 2020

(54) MULTI-PURPOSE, ADJUSTABLE CEILING STORAGE RACK FOR HOLDING SPORTS EQUIPMENT

(71) Applicant: Spire LLC, Troy, VA (US)

(72) Inventor: Joshua Gordon, Charlottesville, VA (US)

(73) Assignee: Spire LLC, Tory, VA (US)

( * ) Notice: Subject to any disclaimer, the term of this patent is extended or adjusted under 35 U.S.C. 154(b) by 0 days.

(21) Appl. No.: 16/056,655

(22) Filed: Aug. 7, 2018

(65) Prior Publication Data

US 2019/0049065 A1    Feb. 14, 2019

Related U.S. Application Data

(60) Provisional application No. 62/542,910, filed on Aug. 9, 2017.

(51) Int. Cl.
*F16M 13/02* (2006.01)
*A47B 45/00* (2006.01)
*A47F 7/00* (2006.01)
*A47F 5/08* (2006.01)

(52) U.S. Cl.
CPC .......... *F16M 13/027* (2013.01); *A47B 45/00* (2013.01); *A47F 5/0892* (2013.01); *A47F 7/0035* (2013.01)

(58) Field of Classification Search
CPC .... F16M 13/027; A47F 5/0892; A47F 7/0035
USPC .................................. 211/21, 117, 118, 113
See application file for complete search history.

(56) References Cited

U.S. PATENT DOCUMENTS

| 30,249 | A | * | 10/1860 | Robinson | A47F 5/0892 211/117 |
|---|---|---|---|---|---|
| 32,147 | A | * | 4/1861 | Robinson | A47F 5/0892 211/117 |
| 40,936 | A | * | 12/1863 | Horn | A47G 25/743 211/115 |
| 618,999 | A | * | 2/1899 | Sayer | B62H 3/12 211/17 |
| 681,397 | A | * | 8/1901 | Junker | A47G 25/18 211/116 |
| 812,396 | A | * | 2/1906 | Bewyer | F21V 21/02 211/117 |
| 1,090,837 | A | * | 3/1914 | Clarke | A47F 5/0892 211/117 |
| 1,113,169 | A | * | 10/1914 | Kyllo | A47F 5/0892 211/100 |
| 1,178,343 | A | * | 4/1916 | Payne et al. | A47G 25/743 211/115 |

(Continued)

*Primary Examiner* — Stanton L Krycinski
(74) *Attorney, Agent, or Firm* — Garrett IP

(57) ABSTRACT

A storage system for items such as surfboards, kayaks, paddleboards, skies, and other similar items is comprised of one or more storage devices that are secured to a ceiling joist, and which have a vertical portion that extends toward the floor. The storage devices have arm portions that extend from near the bottom of the devices on which one would place the item to be stored. The arm portions are at an angle from the vertical portion sufficient to hold the item to be stored in place, but sufficiently shallow to minimize the space needed to accommodate the item. In most useful embodiments, two storage devices are used together and the item to be stored spans the two devices.

17 Claims, 4 Drawing Sheets

(56) References Cited

U.S. PATENT DOCUMENTS

| | | | | | |
|---|---|---|---|---|---|
| 1,222,242 | A | * | 4/1917 | Payne et al. | A47G 25/743 |
| | | | | | 211/115 |
| 2,803,349 | A | * | 8/1957 | Talbot | B62H 3/00 |
| | | | | | 211/22 |
| 2,848,118 | A | * | 8/1958 | Gibson | D06F 57/125 |
| | | | | | 211/118 |
| 3,814,023 | A | * | 6/1974 | Stantial | A47G 25/02 |
| | | | | | 104/94 |
| 4,127,252 | A | * | 11/1978 | Splawn | G12B 9/08 |
| | | | | | 248/333 |
| 4,431,108 | A | * | 2/1984 | Lee | A47F 7/24 |
| | | | | | 211/113 |
| 4,630,990 | A | * | 12/1986 | Whiting | B60R 9/042 |
| | | | | | 224/310 |
| 4,840,278 | A | * | 6/1989 | Gelinas | B62H 3/12 |
| | | | | | 211/118 |
| D380,666 | S | * | 7/1997 | Sheftel | D8/372 |
| 5,649,656 | A | * | 7/1997 | Davy | B60P 3/1025 |
| | | | | | 224/405 |
| D423,338 | S | * | 4/2000 | Laga | D8/372 |
| 6,634,611 | B1 | * | 10/2003 | Shih | F16M 11/10 |
| | | | | | 248/291.1 |
| 7,168,575 | B2 | * | 1/2007 | Olsen, Jr. | B60P 3/073 |
| | | | | | 211/17 |
| 8,567,738 | B1 | * | 10/2013 | Adair | A61M 5/1415 |
| | | | | | 128/877 |

* cited by examiner

US 10,830,389 B2

MULTI-PURPOSE, ADJUSTABLE CEILING STORAGE RACK FOR HOLDING SPORTS EQUIPMENT

FIELD OF THE INVENTION

The subject matter of this application pertains to hanging storage devices and systems. More particularly it pertains to hanging storage devices and systems suitable for surfboards, paddleboards, kayaks and related items. Even more particularly, the subject matter of this application pertains to lower-profile hanging storage devices and systems that occupy otherwise empty space such as, inter alia, that above vehicles in a garage.

BACKGROUND

Long before Bodhi (Patrick Swayze's character in Point Break) begged Utah (Keanu Reeves) to let him surf a once-in-a-lifetime wave before being taken away, and before Annnete Funicello and Frankie Avalon learned how to stuff a wild bikini, people have been making their way across the water on surfboards.

Surfboards, along with other outdoor gear such as wakeboards, paddleboards, water skis, kayaks, snow skis, and snowboards can be outrageously fun when put to their use. But, everything has its downside and for these items, one big downside is storage. Obviously, the larger the item is, the harder it is to store. In the case of surfboards it's common for people to prop them up against a wall when not in use, but this tempts fate by making it too easy for the board to be damaged by being knocked over or being accidentally struck by other items.

There are several surfboard racks available, many of which are intended to be mounted on a wall in the garage. Since surfboards can be so large, storage on the wall may take up the entire wall. Further, such racks still expose the surfboard to being struck by other things in the garage such as a lawn mower, rakes, or the owner after a beer too many.

Rather than taking up a wall for a large surfboard, kayak, or other such gear, and subjecting it to possible trauma it would be preferable to make use of otherwise ignored, overhead space.

SUMMARY

The subject matter of this application concerns overhead storage devices and systems. More precisely, the subject matter of this application pertains to overhead storage devices and systems for surfboards, kayaks, skis and other similar items.

The subject matter of this application describes overhead storage devices and overhead storage system comprised of at least two overhead storage devices. Each overhead storage device comprises a vertical portion which attaches to the ceiling and at least one arm. In use, at least two such overhead storage devices are attached to a ceiling some distance apart from each other, and a load spans the two units. When used together as part of the overhead storage system, the arms of the overhead storage devices are largely parallel and each arm is positioned slightly less than 90° from the vertical portion. Objects supported on an arm of an overhead storage device, or across arms of a said overhead storage system, tend to slide toward the vertical portion of the overhead storage device and are held in place by gravity.

Such an overhead storage device system is capable of supporting one or more items such as, inter alia, surfboards or kayaks in commonly non-utilized space, such as the space between the garage ceiling and the roof of a car.

DETAILED DESCRIPTION OF THE DRAWINGS

Figure 1:
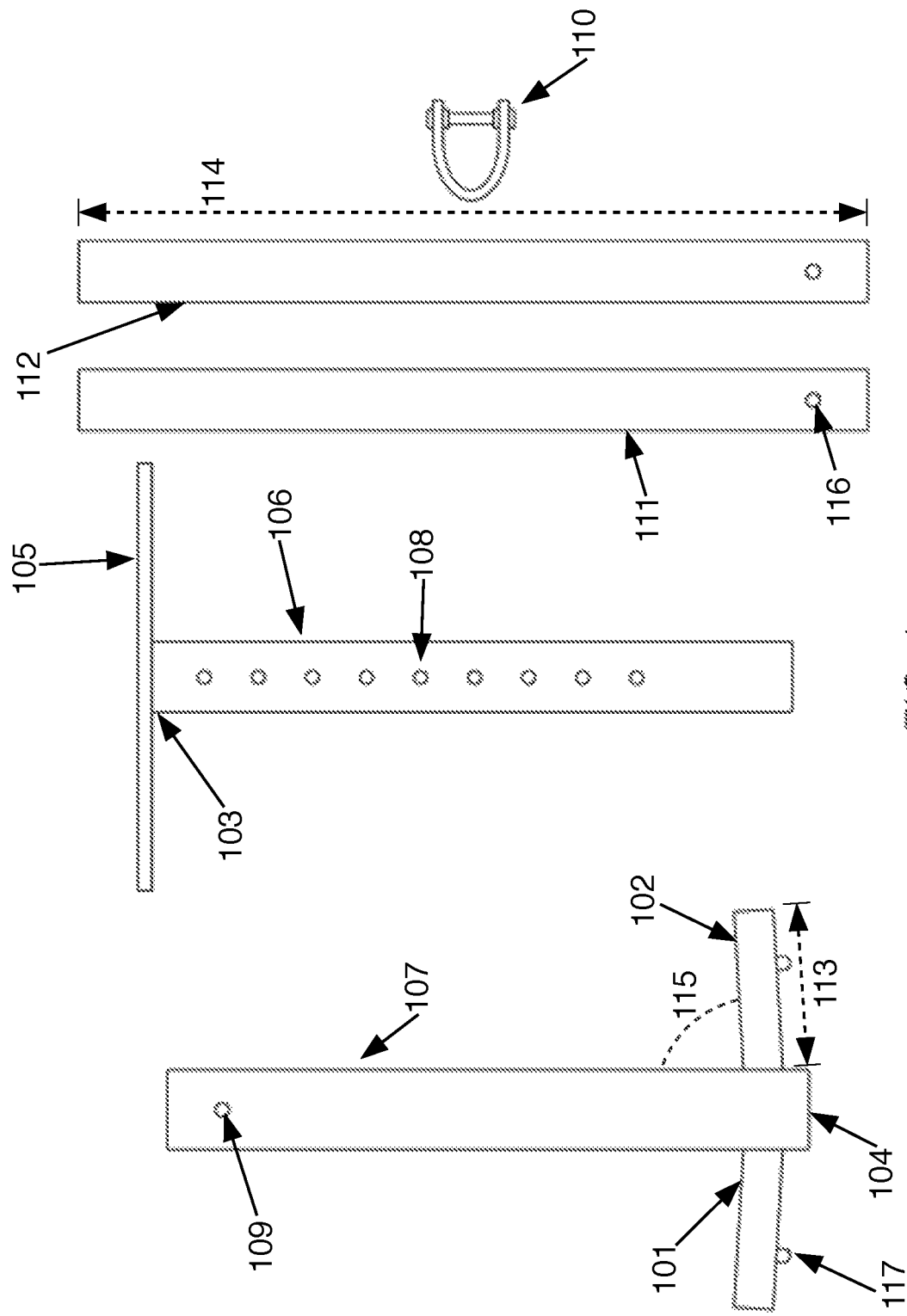
FIG. 1 is a view of the disclosed overhead storage device before assembly.
Figure 2:
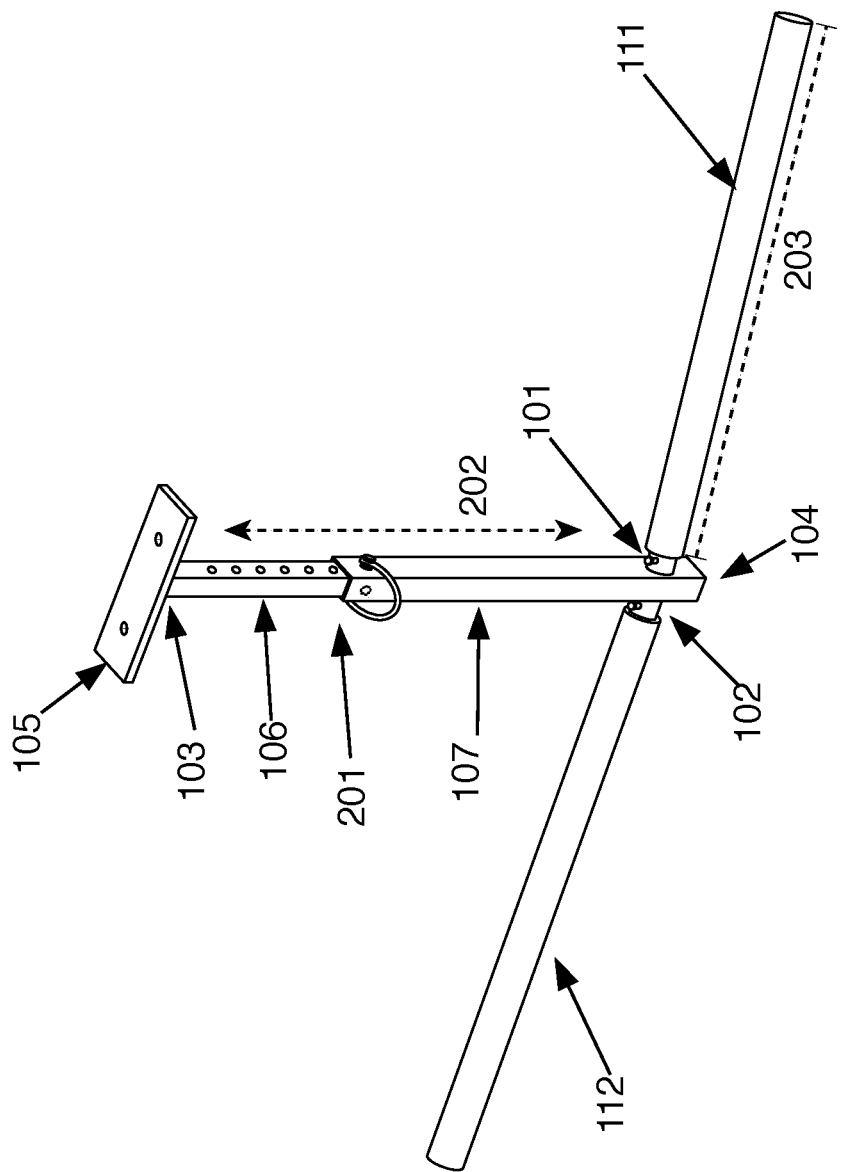
FIG. 2 is a view of the assembled overhead storage device.
Figure 3:
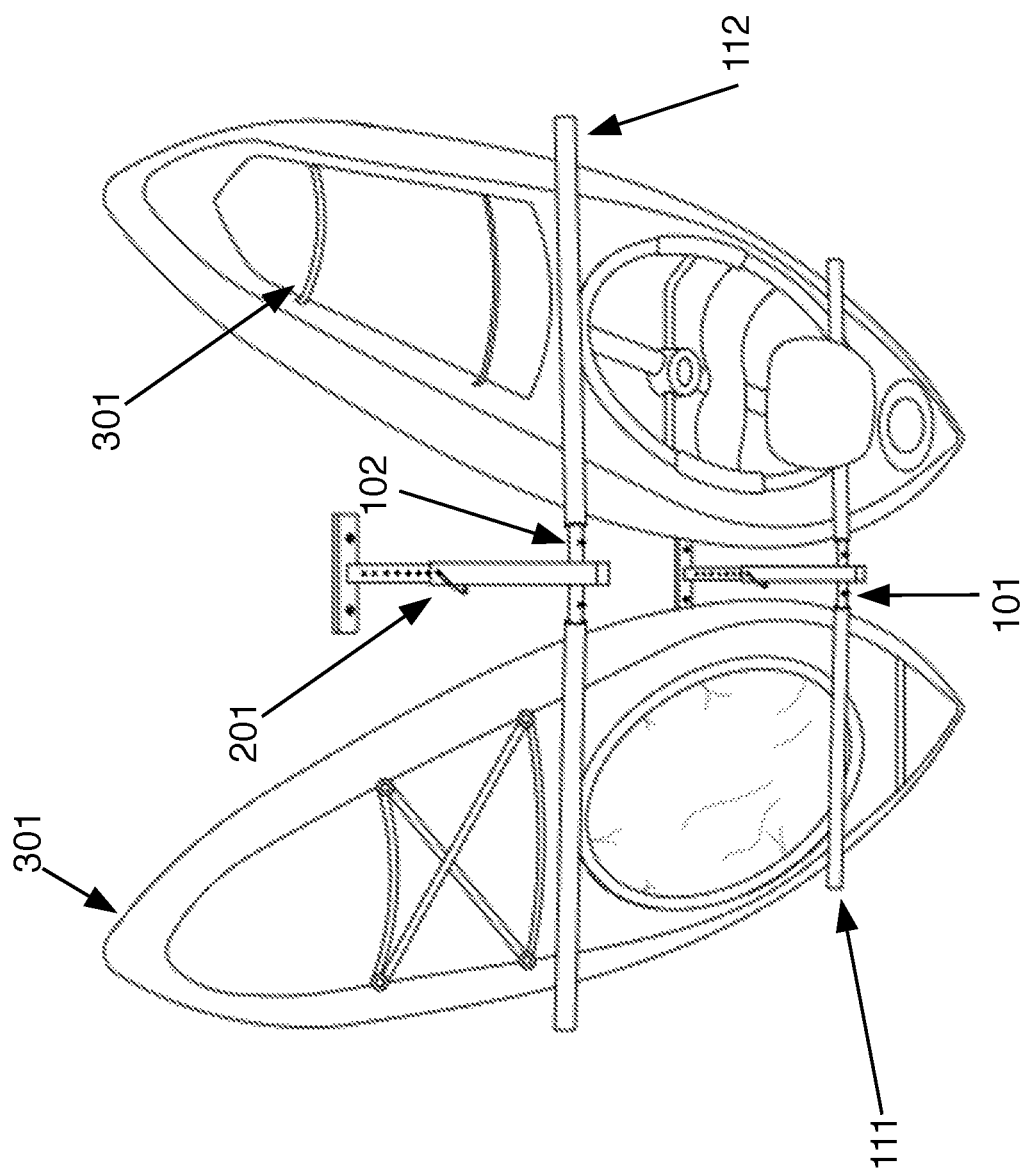
FIG. 3 is a view of the overhead storage system supporting two kayaks.
Figure 4:
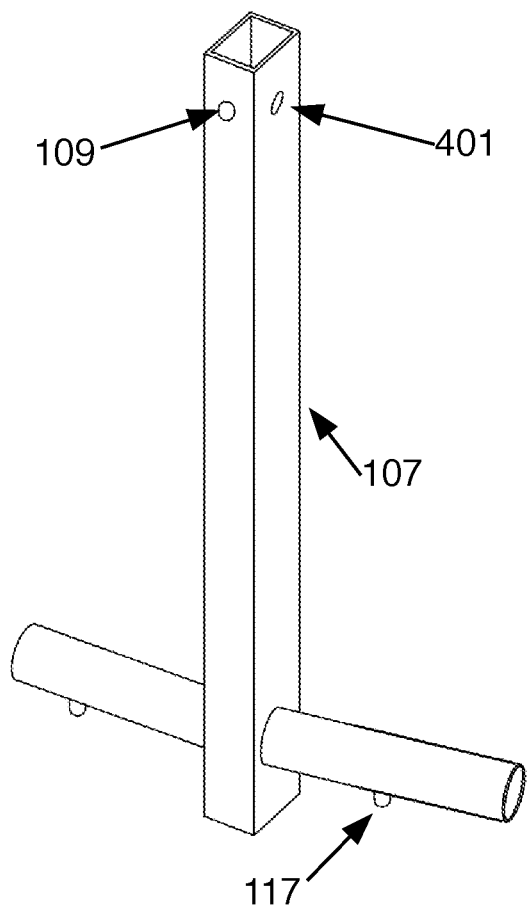
FIG. 4 is a perspective view of the second section of the vertical portion of a preferred embodiment of the disclosed overhead storage system.

The following description and referenced drawings illustrate embodiments of the application's subject matter. They are not intended to limit the scope. Those familiar with the art will recognize that other embodiments of the disclosed method are possible. All such alternative embodiments should be considered within the scope of the application's claims.

Each reference number consists of three digits. The first digit corresponds to the number of the figure in which that reference number is first shown. Reference numbers are not necessarily discussed in the order of their appearance in the figures.

An overhead storage system is comprised of at least two overhead storage devices. Each said overhead storage device is comprised of a vertical portion (201) and a first arm portion (101). Most preferred embodiments further comprise a second arm portion (102). The vertical portion comprises a top (103), a bottom (104), a longitudinal axis (202), and a length measured between the top and bottom along said longitudinal axis. The top of the vertical portion comprises a ceiling attachment means (105).

In preferred embodiments said vertical portion is comprised of a first section (106) and a second section (107). In a most preferred embodiment, the first section and second section of the vertical portion are square or annular tubes. In this embodiment, the first section of the vertical portion and the second section of the vertical portion are sized such that one such vertical portion can be inserted into the other such vertical portion. For this most preferred embodiment the first section maybe either the larger section or the smaller section. Further, in this most preferred embodiment, the first section of the vertical portion comprises at least one hole that extends through said first portion (e.g., 108) and the second section of the vertical portion each comprises at least one hole (109) that extends through said second portion which align when the smaller portion is inserted into the larger portion. In this way a bolt or pin (110) may be inserted through the aligned holes to hold the two vertical sections together. At least one said section may further comprise a second set of holes (401), offset from the first set of holes of said section so the position of the arm portion or portions may be rotated in relation to the ceiling attachment means. In these preferred embodiments, said first section of the vertical portion comprises said ceiling attachment means (105) and the second section of the vertical portion comprises said first arm portion (101) and, if present, said second arm portion (102).

In preferred embodiments, the overhead storage device further comprises a first extension arm (111) that reversibly connects to the first arm portion (101) via a two-segment reversible attachment system. Further, in preferred embodiments that include a second arm portion, said overhead storage device further comprises a second extension arm (112) that can be reversibly connected to the second arm portion (102). An extension arm comprises a length (114) and first segment of a two-segment reversible attachment system (116). An arm portion comprises a length (113) and second segment of a two-segment reversible attachment system (117). In a most highly preferred embodiment, this two-segment reversible attachment system is a ball lock and paired socket. An effective arm length (203) is defined as the length of the structure formed by reversibly attaching an arm portion and an arm extension. In the absence of an extension arm portion, an effective arm length is equal to the length of the arm portion (101, 102). In preferred embodiments, the effective arm length is at least equal to the distance needed to support a load such as a surfboard.

Preferably, the first arm portion and if present, the second arm portion form an angle (115) between 75° and 89° from the longitudinal axis of the vertical portion. In this way, articles (301) placed on top of an arm portion (or on top of an extension arm) tend to move toward the vertical portion and are held in place by gravity. Most preferably, said angle is approximately 87°, an angle determined to provide the requisite slant to hold an article in place, yet slight enough to minimize the distance from the ceiling needed to accommodate items such as surfboards.

In use, the ceiling attachment means is anchored to the ceiling of a room, most preferably to a joist. If there are two vertical sections, those are attached to each other, preferably before anchoring the attachment means to the ceiling. Further, if present, the second section of the vertical portion may be rotated to align a second set of holes of one section of the vertical portion with the first set of holes of the other section of the vertical portion. In this way a user may place the overhead storage device such that the arm portions are aligned with the ceiling joists or not, as needed to accommodate the needs of the user and the direction of the ceiling joists. Further, if present, the first and second extension arms are attached to the first and second arm portions respectively. A second overhead storage device is similarly installed close enough to the other overhead storage device so that a load such as a surfboard spans the arm portions of the two overhead storage devices.

I claim:

1. An apparatus, comprising:
   first and second overhead storage devices, each including,
   a first section configured to hang from a ceiling,
   a second section that extends downwardly from the first section, and
   first and second load-bearing arms that extend from the second section in opposite directions from one another diagonally upward from the second section at an angle within a range of 75 degrees to 89 degrees relative to a longitudinal axis of the first and second sections;
   wherein the second section of each of the first and second overhead storage devices is configurable in a first configuration such that, when the first section of the first overhead storage device is hung from a first joist of the ceiling and the first section of the second overhead storage device is hung from a second joist of the ceiling, the load-bearing arm of each of the first and second overhead storage devices is in alignment with a respective one of the first and second joists of the ceiling; and
   wherein the second section of each of the first and second overhead storage devices is configurable in a second configuration such that, when the first section of each of the first and second overhead storage devices is hung from the first joist of the ceiling, the load-bearing arm of each of the first and second overhead storage devices is out of alignment with the first joist of the ceiling.

2. The apparatus of claim 1, wherein:
   the first and second load-bearing arms of each of the first and second overhead storage devices are ninety degrees out of alignment with the first joist in the second configuration.

3. The apparatus of claim 1, wherein:
   the first section has an aperture therethrough;
   the second section has first and second apertures therethrough that are offset from one another by ninety degrees about the longitudinal axis of the vertical section;
   the aperture of the first section is aligned with the first aperture of the second section in the first configuration; and
   the aperture of the first section is aligned with the second aperture of the second section in the second configuration.

4. The apparatus of claim 3, wherein:
   the first and second sections each include a respective hollow tube;
   the aperture of the first section includes a pair of opposing apertures through opposing walls of the hollow tube of the first section; and
   the first and second apertures of the second section each includes a pair of opposing apertures through opposing walls of the hollow tube of the second section.

5. The apparatus of claim 1, further including:
   a pin that is insertable through aligned apertures of the first and second sections to maintain the second section in a selected one of the first and second configurations.

6. The apparatus of claim 1, wherein the first and second sections are detachable from one another.

7. The apparatus of claim 1, wherein one of the first and second sections is configured to slideably insert into the other one of the first and second sections.

8. The apparatus of claim 1, wherein each of the first and second sections includes a hollow square tube.

9. The apparatus of claim 1, wherein each of the first and second sections includes a hollow annular tube.

10. The apparatus of claim 1, wherein the first and second load-bearing arms of each of the first and second overhead storage devices extend diagonally upward from the respective second section at an angle of 87 degrees relative to the longitudinal axis.

11. The apparatus of claim 1, wherein each of the first and second load-bearing arms of each of the first and second overhead storage devices includes a respective detachable extension.

12. The apparatus of claim 1, wherein each of the first and second load-bearing arms of each of the first and second overhead storage devices is configured to support a portion of outdoor sporting gear.

13. The apparatus of claim 12, wherein each of the first and second load-bearing arms of each of the first and second overhead storage devices is further configured to support a portion of a surfboard, a wakeboard, a paddleboard, water skis, snow skis, and/or a snowboard.

14. The apparatus of claim 1, wherein:
   the first load-bearing arms of the first and second overhead storage device are configured to support first outdoor sporting gear that extends across the first load-bearing arms of the first and second overhead storage devices; and the second load-bearing arms of the first and second overhead storage devices are configured to support second outdoor sporting gear that extends across the second load-bearing arms of the first and second overhead storage devices.

15. The apparatus of claim 14, wherein each of the first and second outdoor sporting gear includes a surfboard, a wakeboard, a paddleboard, water skis, snow skis, and/or a snowboard.

16. The apparatus of claim 1, wherein the first section of each of the first overhead storage device is configured to mount to a lower horizontal surface of the first joist.

17. An apparatus, consisting of:
first and second overhead storage devices, each of the first and second overhead storage devices consisting of,
a first section configured to hang from a ceiling,
a second section that extends downwardly from the first section, and
first and second load-bearing arms that extend from the second section in opposite directions from one another diagonally upward from the second section at an angle within a range of 75 degrees to 89 degrees relative to a longitudinal axis of the first and second sections;

wherein the second section of each of the first and second overhead storage devices is configurable in a first configuration such that, when the first section of the first overhead storage device is hung from a first joist of the ceiling and the first section of the second overhead storage device is hung from a second joist of the ceiling, the load-bearing arm of each of the first and second overhead storage devices is in alignment with a respective one of the first and second joists of the ceiling, and wherein the second section of each of the first and second overhead storage devices is configurable in a second configuration such that, when the first section of each of the first and second overhead storage devices is hung from the first joist of the ceiling, the load-bearing arm of each of the first and second overhead storage devices is out of alignment with the first joist of the ceiling.

* * * * *